United States Patent
Liu et al.

(10) Patent No.: US 10,511,062 B2
(45) Date of Patent: Dec. 17, 2019

(54) SYSTEM AND METHOD FOR SELF-ISOLATING ABNORMAL BATTERY

(71) Applicant: CONTEMPORARY AMPEREX TECHNOLOGY CO., LIMITED, Ningde (CN)

(72) Inventors: Kai Liu, Ningde (CN); Xiaoqing Xue, Ningde (CN); Shijie Wu, Ningde (CN); Chao Hsien Tang, Ningde (CN); Zhu Feng, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 68 days.

(21) Appl. No.: 15/394,964

(22) Filed: Dec. 30, 2016

(65) Prior Publication Data

US 2017/0222276 A1 Aug. 3, 2017

(30) Foreign Application Priority Data

Feb. 3, 2016 (CN) .............................. 201610076157

(51) Int. Cl.
*H01M 10/42* (2006.01)
*H01M 10/48* (2006.01)
*H02J 7/00* (2006.01)

(52) U.S. Cl.
CPC ....... *H01M 10/4221* (2013.01); *H01M 10/42* (2013.01); *H01M 10/425* (2013.01);
(Continued)

(58) Field of Classification Search
CPC ............. H01M 10/4221; H01M 10/42; H01M 10/425; H01M 10/48; H01M 2010/4271
See application file for complete search history.

(56) References Cited

U.S. PATENT DOCUMENTS

| 7,535,199 B2 | 5/2009 | Kimura | |
| 7,939,190 B2 * | 5/2011 | Colello | ............ H01M 8/04679 |
| | | | 429/149 |

FOREIGN PATENT DOCUMENTS

| CN | 1825676 A | 8/2006 |
| CN | 101572325 A | 11/2009 |

(Continued)

OTHER PUBLICATIONS

Chinese Office Action from corresponding Chinese Application No. 201610076157.1, dated Aug. 23, 2017.
(Continued)

*Primary Examiner* — Anthony R Jimenez
(74) *Attorney, Agent, or Firm* — Tucker Ellis LLP

(57) ABSTRACT

A system and method for self-isolating an abnormal battery. The system includes: a switch controlling module, a battery detecting module, a data analyzing module and at least two switch battery modules, the switch battery modules includes at least one isolating switch, at least one main circuit switch and a battery, the main circuit switch is connected with the battery in series, a series circuit composed of the main circuit switch and the battery is connected in parallel to the isolating switch so as to form a switch battery module, the switch battery modules are connected with each other in series; the battery detecting module is connected with the battery and the data analyzing module; the switch controlling module is connected with the main circuit switch, the isolating switch and the data analyzing module. The problem that failure of a single battery may cause the whole system cannot work, is solved.

8 Claims, 4 Drawing Sheets

(52) U.S. Cl.
CPC .......... *H01M 10/48* (2013.01); *H02J 7/0026* (2013.01); *H02J 7/0068* (2013.01); *H01M 2010/4271* (2013.01)

(56) References Cited

FOREIGN PATENT DOCUMENTS

| | | |
|---|---|---|
| CN | 101714649 A | 5/2010 |
| CN | 102664291 A | 7/2011 |

OTHER PUBLICATIONS

Chinese Office Action from corresponding Chinese Application No. 201610076157.1, dated Mar. 23, 2018.

\* cited by examiner

SYSTEM AND METHOD FOR SELF-ISOLATING ABNORMAL BATTERY

CROSS-REFERENCE TO RELATED APPLICATIONS

The present application claims priority to Chinese Patent Application No. 201610076157.1, filed on Feb. 3, 2016, the content of which is incorporated herein by reference in its entirety.

TECHNICAL FIELD

The present application relates to the field of secondary battery technologies and, particularly, to a system and a method for self-isolating abnormal battery.

BACKGROUND

Li-ion battery is a kind of secondary battery (rechargeable battery), which operates based on movements of lithium ions between the positive electrode and negative electrode. During the charging-discharging process, Li+ is intercalated and dis-intercalated back and forth between the two electrodes: when charging, Li+ is dis-intercalated from the positive electrode, goes through the electrolyte and is intercalated into the negative electrode, then the negative electrode is at a Li-rich state; it is on the contrary when discharging. A battery usually adopts a lithium containing material as the electrode, which is a representative of modern high performance battery. As long as Li-ion battery is commercialized, due to its advantages such as high energy density, high voltage, low self-discharging rate, light weight and the like, its commercialization development is rapid, for example, it is widely applied in the field of electronic products such as cellphone, laptop, digital camera, mobile DVD, video camera, MP3 and the like, as well as the field of transportation means such as electric bicycle, electric vehicle and the like. In addition, applying Li-ion battery can save space, reduce cost as well as solve the problem that the capacities of batteries must be matched with each other when being connected in series, so as to increase energy density, improve reliability when in use, moreover, the Li-ion battery has no memory effect, which will not pollute the environment. As a new secondary battery, with continuous improvements on its performance such as cycling performance, low-temperature performance, service life and safety etc., the Li-ion battery may possibly be widely applied in the field of military equipment either.

At present, the requirements on energy is higher and higher, a single battery cannot provide sufficient energy, a solution is provided to connect a plurality of batteries in series or in parallel to form a battery pack so as to solve the above problem, however, as a result of the difference and quality reasons among single batteries, a single battery or several batteries in the battery pack may not be continuously used due to the service life, performance, safety and so on, such a situation may cause that the whole battery pack cannot keep operating, which has to be repaired or replaced or even discarded and recycled.

SUMMARY

The present invention provides a system and a method for self-isolating abnormal battery, so as to solve the problem that the whole battery pack cannot keep operating because a single battery or several batteries in the battery pack cannot be continuously used due to the service life, performance, safety and so on, causing that the whole battery pack has to be repaired or replaced or even discarded and recycled.

The present invention provides a system for self-isolating abnormal battery, including: a switch controlling module, a battery detecting module, a data analyzing module and at least two switch battery modules;

each of the switch battery modules comprises at least one isolating switch, at least one main circuit switch and a battery, the main circuit switch is connected with the battery in series to form a series circuit, the series circuit is connected in parallel to the isolating switch so as to form a switch battery module, the switch battery modules are connected with each other in series;

the battery detecting module is configured to detect a battery status parameter and provide the detected battery status parameter to the data analyzing module;

the data analyzing module is configured to judge whether an operating status of the battery is normal or not according to the battery status parameter, and provide a signal to the switch controlling module;

the switch controlling module is configured to generate an on/off signal according to the signal provided by the data analyzing module, and apply the on/off signal to the main circuit switch and the isolating switch in the switch battery module, so as to alternatively control on/off of the main circuit switch and the isolating switch in the switch battery module.

Further, in the above system for self-isolating abnormal battery, the data analyzing module is specifically configured to:

compare each battery status parameter with a battery normal status parameter threshold;

judge whether the battery status parameter is beyond an upper limit of the battery normal status parameter threshold, or whether the battery status parameter is below a lower limit of the battery normal status parameter threshold;

when the battery status parameter is beyond the upper limit of the battery normal status parameter threshold, or when the battery status parameter is below the lower limit of the battery normal status parameter threshold, then determine that an operating status of the battery is abnormal, and generate an abnormal switch switching instruction and provide it to the switch controlling module;

when the battery status parameter is within a range between the upper limit and lower limit of the battery normal status parameter threshold, then determine that an operating status of the battery is normal, and generate a normal switch switching instruction and provide it to the switch controlling module.

Further, in the above system for self-isolating abnormal battery, the abnormal switch switching instruction is used for instructing to switch off the main circuit switch, and switch on the isolating switch;

the normal switch switching instruction is used for instructing to switch on the main circuit switch, and switch off the isolating switch.

Further, in the above system for self-isolating abnormal battery, the battery status parameter detected by the battery detecting module includes at least one of following parameters:

a voltage value of the battery, a temperature value of the battery and an internal pressure value within a shell of the battery.

Further, in the above system for self-isolating abnormal battery, the upper limit of the battery normal status parameter threshold includes at least one of following parameters:

an upper limit of voltage threshold value of the battery, an upper limit of temperature threshold value of the battery and an upper limit of internal pressure threshold value of the shell of the battery.

Further, in the above system for self-isolating abnormal battery, the lower limit of the battery normal status parameter threshold includes at least one of following parameters:

a lower limit of voltage threshold value of the battery and a lower limit of temperature threshold value of the battery.

Further, in the above system for self-isolating abnormal battery:

the data analyzing module is further configured to: generate a detection preparation instruction before receiving the battery status parameter collected by the battery detecting module, and provide it to the switch controlling module.

the switch controlling module is further configured to: when receiving the detection preparation instruction sent by the data analyzing module, control to switch on all the main circuit switches in the switch battery modules, and control to switch off all the isolating switches in the switch battery modules, so as to connect all the batteries in the switch battery modules in series.

Further, in the above system for self-isolating abnormal battery, the main circuit switch and the isolating switch are physical switches or chemical switches.

The present invention further provides a method for self-isolating abnormal battery, which is executed by the above system for self-isolating abnormal battery, the method includes steps of:

collecting, by the battery detecting module, a battery status parameter and sending the battery status parameter to the data analyzing module;

judging, by the data analyzing module, whether an operating status of the battery is normal or not according to the battery status parameter, and providing a signal to the switch controlling module;

generating, by the switch controlling module, an on/off signal according to the signal provided by the data analyzing module, and applying the on/off signal to the main circuit switch and the isolating switch in the switch battery module, so as to alternatively control on/off of the main circuit switch and the isolating switch in the switch battery module.

Further, in the above method for self-isolating abnormal battery, the step of judging, by the data analyzing module, whether the operating status of the battery is normal or not according to the battery status parameter, and providing a signal to the switch controlling module, includes:

comparing, by the data analyzing module, each battery status parameter with a battery normal status parameter threshold;

judging, by the data analyzing module, whether the battery status parameter is beyond an upper limit of the battery normal status parameter threshold, or whether the battery status parameter is below a lower limit of the battery normal status parameter threshold;

when the battery status parameter is beyond the upper limit of the battery normal status parameter threshold, or when the battery status parameter is below the lower limit of the battery normal status parameter threshold, then determining, by the data analyzing module, that the operating status of the battery is abnormal, and generating an abnormal switch switching instruction and providing it to the switch controlling module;

when the battery status parameter is within a range between the upper limit and lower limit of the battery normal status parameter threshold, then determining, by the data analyzing module, that the operating status of the battery is normal, and generating a normal switch switching instruction and providing it to the switch controlling module.

Further, in the above method for self-isolating abnormal battery, before the data analyzing module receives the battery status parameter collected by the battery detecting module, further including:

when the battery status parameter is between the upper limit and lower limit of the battery normal status parameter threshold, then determining, by the data analyzing module, that the operating status of the battery is normal, and generating a normal switch switching instruction and providing it to the switch controlling module;

receiving, by the switch controlling module, the detection preparation instruction sent by the data analyzing module, controlling to switch on all the main circuit switches in the switch battery modules, and controlling to switch off all the isolating switches in the switch battery modules, so as to connect all the batteries in the switch battery modules in series.

In the system and method for self-isolating abnormal battery according to the present invention, the battery detecting module collects the battery status parameter and sends the collected status parameter to the data analyzing module; the data analyzing module judges whether the operating status of the battery is normal according to the battery status parameter, and provides a signal to the switch controlling module; the switch controlling module generates an on/off signal according to the signal provided by the data analyzing module, and applies the on/off signal to the main circuit switch and the isolating switch in the switch battery module, so as to alternatively control the on and off of the main circuit switch and the isolating switch in the switch battery module. When fault occurs to a specific battery in the system for self-isolating abnormal battery, the battery can be isolated, without affecting normal use of the whole system, so that when battery capacity is sufficient, the whole system will not break down due to damage of a specific or several batteries. The problem that the whole battery pack cannot keep operating because a single battery or several batteries in the battery pack cannot be continuously used due to the service life, performance, safety and so on, causing that the whole battery pack has to be repaired or replaced or even discarded and recycled, is solved.

BRIEF DESCRIPTION OF DRAWINGS

In order to illustrate technical solutions of embodiments of the present invention or the prior art more clearly, the accompanying drawings used in the embodiments or the prior art will be briefly introduced hereinafter. Obviously, the drawings described are only some of the embodiments of the present invention, on the basis of these drawings, those of ordinary skill in the art can also obtain other drawings without creative efforts.

DESCRIPTION OF EMBODIMENTS

In order to make objects, technical solutions and advantages of the present invention more clearly, the technical solutions in the embodiments of the present invention will be described clearly and completely combining the drawings in the embodiments of the present invention. Obviously, the described embodiments are only a part of the embodiments, rather than all of them. Based on the embodiments of the present invention, any other embodiments obtained by those of ordinary skill in the art without creative efforts shall fall in the protection scope of the present invention.

Figure 1:
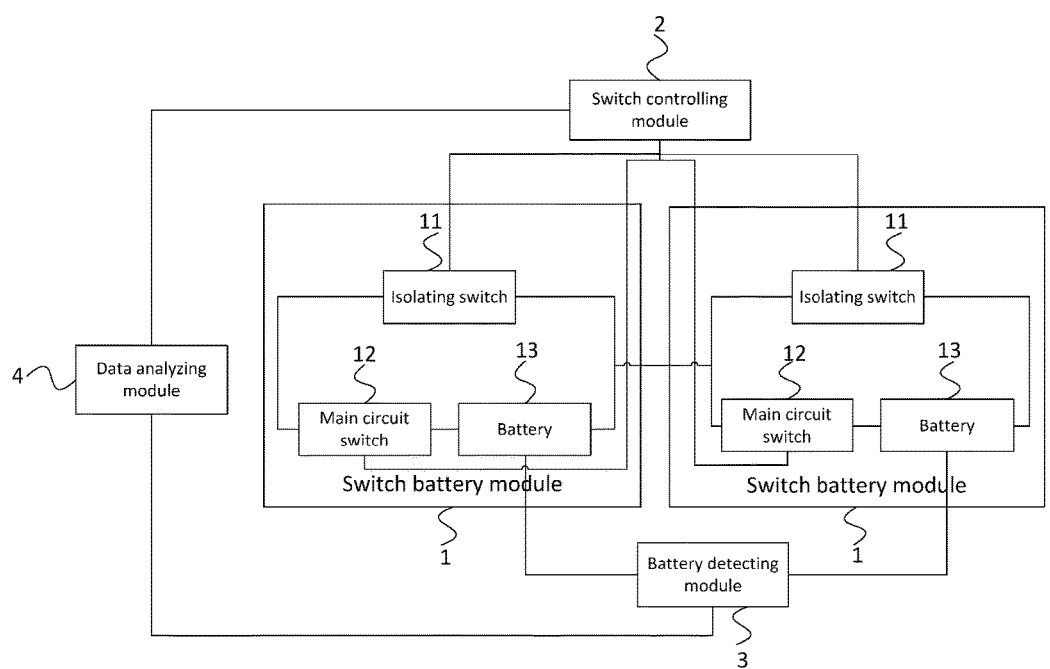
FIG. 1 is a structural schematic diagram of a system for self-isolating abnormal battery according to a first system embodiment of the present invention.

FIG. 1 is a structural schematic diagram of a system for self-isolating abnormal battery according to a first system embodiment of the present invention, as shown in FIG. 1, the system for self-isolating an abnormal battery includes: at least two switch battery modules 1, a switch controlling module 2, a battery detecting module 3 and a data analyzing module 4, the switch battery module 1 includes at least one isolating switch 11, at least one main circuit switch 12 and a battery 13, that is, in practical application, the system for self-isolating abnormal battery can include three or more switch battery modules, correspondingly, the number of the isolating switch 11, the main circuit switch 12 and the battery 13 can all be three or more. In FIG. 1, a system for self-isolating abnormal battery including two switch battery modules is taken as an example.

In practical application, the switch battery module 1 is an integrated whole by connecting a physical switch such as a relay, or a chemical switch such as a membrane switch with a secondary battery in serial or in parallel. In practical application, the switch controlling module 2 can adopt a typical analog circuit, such as an analog front-end circuit, which is not limited thereto. In practical application, the battery detecting module 3 can be a voltage measuring instrument, a temperature sensor, a pressure sensor, which is not limited thereto. In practical application, the data analyzing module 4 can be a single chip microcomputer (Single Chip Microcomputer, SCM) or an analog circuit of a discrete component design, which is not limited thereto.

The main circuit switch 12 is connected with the battery 13 in series, a switch battery module 1 is constituted by a parallel connection of the isolating switch 11 and the series circuit constituted by the main circuit switch 12 and the battery 13, the switch battery modules 1 are connected with each other in series.

The battery detecting module 3 is respectively connected with the battery 13 and the data analyzing module 4, configured to detect the battery status parameter and provide the detected status parameter to the data analyzing module 4. The battery detecting module 3 detects, in real time, the battery status parameter 13 in all the switch battery modules 1 of the system for self-isolating abnormal battery, the status parameter includes at least one of the following parameters: voltage value of the battery 13, temperature of the battery 13, internal pressure value in the shell of the battery 13, and reports these detected battery status parameter to the data analyzing module 4.

The data analyzing module 4 judges whether the operating status of the battery 13 is normal according to the status parameter of the battery 13, and provides a signal to the switch controlling module 2, the data analyzing module 4 analyzes the reported battery status parameter reported by the battery detecting module 3, and provides a signal to the switch controlling module 2 according to the obtained analysis result.

The switch controlling module 2 is respectively connected with the main circuit switch 12, the isolating switch 11 and the data analyzing module 4, configured to generate an on/off signal according to the signal provided by the data analyzing module 4, and apply the on/off signal to the main circuit switch 12 and the isolating switch 11, so as to control the on and off of the main circuit switch 12 and the isolating switch 11 alternatively.

The switch controlling module 2 generates an on/off signal after receiving the signal sent by the data analyzing module 4, and controls the on and off of the main circuit switch 12 and the isolating switch 11 alternatively according to this on/off signal, that is, when the main circuit switch 12 is on, the isolating switch 11 will be in an off status, when the main circuit switch 12 is off, the isolating switch 11 will be in an on status.

The system for self-isolating abnormal battery according to the present embodiment includes: at least two switch battery modules 1, a switch controlling module 2, a battery detecting module 3 and a data analyzing module 4, each switch battery module 1 at least includes at least one isolating switch 11, at least one main circuit switch 12 and a battery 13, the main circuit switch 12 is connected with the battery 13 in series, a switch battery module 1 is constituted by a parallel connection of the isolating switch 11 and the series circuit constituted by the main circuit switch 12 and the battery 13, the switch battery modules 1 are connected with each other in series. The battery detecting module 3 is configured to detect the battery status parameter and provide the detected status parameter of the battery 13 to the data analyzing module 4. The data analyzing module 4 is configured to judge whether the operating status of the battery 13 is normal according to the status parameter of the battery 13, and provide a signal to the switch controlling module 2. The switch controlling module 2 is configured to generate an on/off signal according to the signal provided by the data analyzing module 4, and apply the on/off signal to the main circuit switch 12 and the isolating switch 11, so as to alternatively control the on and off of the main circuit switch 12 and the isolating switch 11. Through the data analyzing module 4 sending instructions of switching on or off the main circuit switch 12 and isolating switching 11 to the switching control module 2 according to the battery status parameter detected by the battery detecting module 3, when fault occurs to a specific battery 13 in the system for self-isolating abnormal battery, the battery 13 can be isolated, without affecting normal use of the whole system, so that when battery capacity is sufficient, the whole system will not break down due to damage of a specific or several batteries 13.

Further, the data analyzing module 4 is specifically configured to compare each battery status parameter with a battery normal status parameter threshold; judge whether the battery status parameter is beyond the upper limit of the battery normal status parameter threshold, or, whether the battery status parameter is below the lower limit of the battery normal status parameter threshold; when the battery status parameter is beyond the upper limit of the battery normal status parameter threshold, or, when the battery status parameter is below the lower limit of the battery normal status parameter threshold, then determine that the operating status of the battery is abnormal, and generate an abnormal switch switching instruction, and provide it to the switch controlling module 2; when the battery status parameter is within the range between the upper limit and lower limit of the parameter threshold of the battery normal status parameter threshold, then determine that the operating status of the battery is normal, and generate a normal switch switching instruction and provide it to the switch controlling module 2.

The data analyzing module 4 compares each battery status parameter with the battery normal status parameter threshold (including the upper limit and lower limit of the battery normal status parameter threshold), judges whether the battery status parameter is normal or not, the specific comparing manner includes: when the battery status parameter is beyond the upper limit of the battery normal status parameter threshold, or, when the battery status parameter is below the lower limit of the battery normal status parameter threshold, then a result that the operating status of the battery is abnormal is obtained, the data analyzing module 4 will generate an abnormal switch switching instruction, and provide it to the switch controlling module 2, the abnormal switch switching instruction is used for instructing to switch off the main circuit switch 12, and switch on the isolating switch 11, after receiving the abnormal switch switching instruction, the switch controlling module 2 will switch off the main circuit switch 12 connected in series with the abnormal battery 13, and switch on the isolating switch 11 connected in parallel to the abnormal battery 13. When the battery status parameter is within the range between the upper limit of the battery normal status parameter threshold, then a result that the operating status of the battery is normal is obtained, the data analyzing module 4 will generate a normal switch switching instruction, and provide it to the switch controlling module 2, the normal switch switching instruction is used for instructing to switch on the main circuit switch 12, and switch off the isolating switch 11, after receiving the normal switch switching instruction, the switch controlling module 2 will switch on the main circuit switch 12 connected in series with the normal battery 13, and switch off the isolating switch 11 connected in parallel to the normal battery 13.

The battery status parameter detected by the battery detecting module 3 includes at least one of the following parameters: voltage value of the battery 13, temperature value of the battery 13 and internal pressure value within the shell of the battery 13.

The upper limit of the battery normal status parameter threshold includes at least one of the following parameters: upper voltage threshold value of the battery 13, upper temperature threshold value of the battery 13 and upper internal pressure threshold value of the shell of the battery 13.

The lower limit of the battery normal status parameter threshold includes at least one of the following parameters: lower voltage threshold value of the battery 13 and lower temperature threshold value of the battery 13.

In the system for self-isolating abnormal battery provided by the present embodiment, the data analyzing module 4 is specifically configured to compare each battery status parameter with the battery normal status parameter threshold, mainly with the upper and lower limit of the voltage value, the upper and lower limit of the temperature value when the battery is in a normal status, and with the upper limit of the internal pressure of the shell of the battery, so as to judge whether the battery status parameter is normal or not, and generate a normal switch switching instruction or an abnormal switch switching instruction according to the status of the battery 13 and provide it to the switch controlling module 2; if the battery status parameter is normal, then send a normal switch switching instruction to the switch controlling module 2, that is, instruct to switch on the main circuit switch 12, and switch off the isolating switch 11; if the battery status parameter is abnormal, then send an abnormal switch switching instruction to the switch controlling module 2, that is, instruct to switch off the main circuit switch 12, and switch on the isolating switch 11. After analyzing the battery status parameter by the data analyzing module 4, whether the status of the battery 13 is normal or not can be accurately judged, and a relevant instruction is sent to the switch controlling module 2, i.e., an instruction which instructs to switch on or switch off the main circuit switch 12 and the isolating switch 11, thereby achieving isolation of the abnormal battery 13 in real time when fault occurs to a certain battery 13, without affecting normal use of the whole system.

Alternatively, the data analyzing module 4 is further configured to generate a detection preparation instruction before receiving the battery status parameter collected by the battery detecting module 3, and provide it to the switch controlling module 2.

Before the battery detecting module 3 sends the collected battery status parameter to the data analyzing module 4, the data analyzing module 4 will send a detection preparation instruction to the switch controlling module 2, after receiving the detection preparation instruction, the switch controlling module 2 will instruct to switch on or switch off the main circuit switch 12 and the isolating switch 11.

The switch controlling module 2 is further configured to, when receiving the detection preparation instruction sent by the data analyzing module 4, control to switch on all the main circuit switches 12 in the switch battery modules 1, and control to switch off all the isolating switches 11 in the switch battery modules 1, so as to connect all the batteries 13 in the switch battery modules 1 in series when switching on all the main circuit switches.

After receiving the detection preparation instruction, the switch controlling module 2 will control to switch on all the main circuit switches 12 in the system for self-isolating abnormal battery, and control to switch off all the isolating switches, when all the main circuit switches are switched on, all the batteries 13 in the switch battery modules 1 are connected in series.

In the system for self-isolating abnormal battery, the main circuit switch 12 and the isolating switch 11 are physical switches or chemical switches. For example, when the main circuit switch 12 and the isolating switch 11 are physical switches, they could be relays, semiconductor switches, magnetic valves, mechanical clips, when the main circuit switch 12 and the isolating switch 11 are chemical switches, they could be membrane switches etc. The battery 13 can be a lithium battery of square shape, cylindrical, soft packed and plastic etc.

In the system for self-isolating abnormal battery provided by the present embodiment, the data analyzing module 4 is specifically configured to compare each battery status parameter with the battery normal status parameter threshold, mainly with the upper and lower limit of the voltage value, the upper and lower limit of the temperature value when the battery is in a normal status, and with the upper limit of the internal pressure of the shell of the battery, so as to judge whether the battery status parameter is normal or not, and generate a normal switch switching instruction or an abnormal switch switching instruction according to the status of the battery 13 and provide it to the switch controlling module 2; if the battery status parameter is normal, then send a normal switch switching instruction to the switch controlling module 2, that is, instruct to switch on the main circuit switch 12, and switch off the isolating switch 11; if the battery status parameter is abnormal, then send an abnormal switch switching instruction to the switch controlling module 2, that is, instruct to switch off the main circuit switch 12, and switch on the isolating switch 11. After analyzing the battery status parameter by the data analyzing module 4, whether the status of the battery 13 is normal or not can be accurately judged, and a relevant instruction is sent to the switch controlling module 2, i.e., an instruction which instructs to switch on or switch off the main circuit switch 12 and the isolating switch 11, thereby achieving isolation of the abnormal battery 13 in real time when fault occurs to a certain battery 13, without affecting normal use of the whole system.

Figure 2:
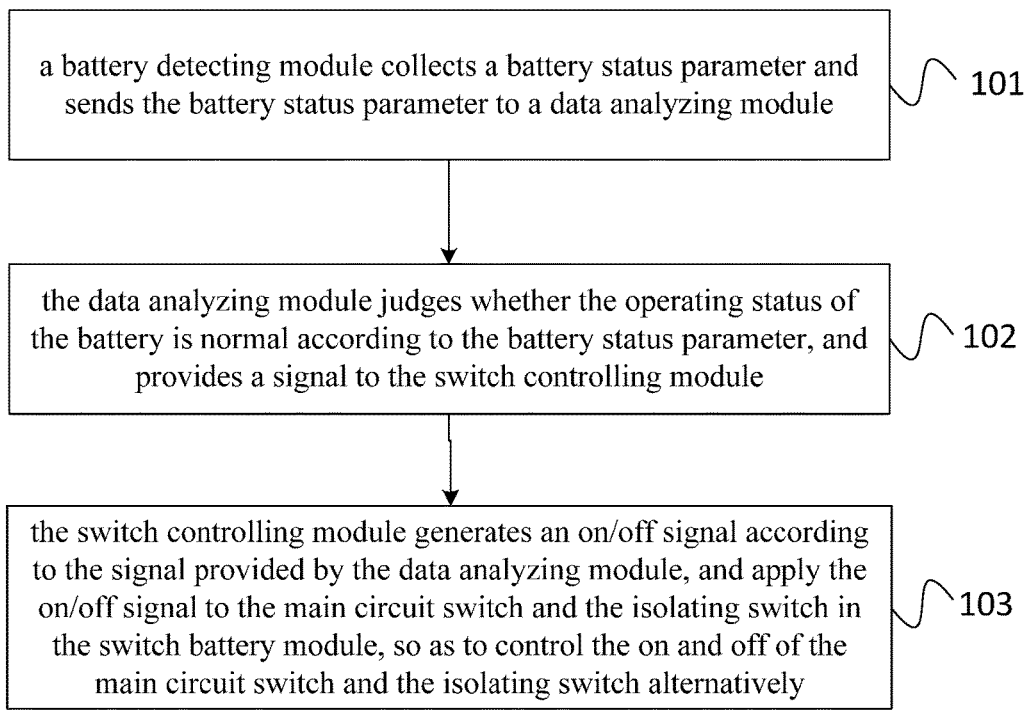
FIG. 2 is a flow diagram of a method for self-isolating abnormal battery according to a first method embodiment of the present invention.

FIG. 2 is a flow diagram of a method for self-isolating abnormal battery according to a first method embodiment of the present invention, the method for self-isolating abnormal battery is specifically executed by the system for self-isolating abnormal battery shown in the embodiment of FIG. 1, the structure of the system for self-isolating abnormal battery can be referred to those recorded in the embodiment in FIG. 1, which will not be repeated here.

As shown in FIG. 2, the method for self-isolating abnormal battery in the present embodiment can specifically include the following steps:

Step 101, a battery detecting module collects a battery status parameter and sends the battery status parameter to a data analyzing module.

Referring to the system for self-isolating abnormal battery shown in the embodiment of FIG. 1, the battery detecting module collects, in real time, the battery status parameter in all the switch battery modules of the system for self-isolating abnormal battery, the status parameter includes at least one of the following parameters: voltage value of the battery, temperature of the battery, internal pressure value in the shell of the battery, and reports these collected battery status parameters to the data analyzing module.

Step 102, the data analyzing module judges whether the operating status of the battery is normal according to the battery status parameter, and provides a signal to the switch controlling module.

Referring to the system for self-isolating abnormal battery shown in the embodiment of FIG. 1, the data analyzing module analyzes the battery status parameter reported by the battery detecting module, and provides a signal to the switch controlling module according to the obtained analysis result.

Step 103, the switch controlling module generates an on/off signal according to the signal provided by the data analyzing module, and apply the on/off signal to the main circuit switch and the isolating switch in the switch battery module, so as to control the on and off of the main circuit switch and the isolating switch alternatively.

Referring to the system for self-isolating abnormal battery shown in the embodiment of FIG. 1, the switch controlling module generates an on/off signal after receiving the signal sent by the data analyzing module, and controls the on and off of the main circuit switch and the isolating switch alternatively according to this signal, that is, when the main circuit switch is on, the isolating switch will be in an off status, when the main circuit switch is off, the isolating switch will be in an on status.

In the method for self-isolating abnormal battery according to the present embodiment, the battery detecting module collects the battery status parameter and sends the collected battery status parameter to the data analyzing module; the data analyzing module judges whether the operating status of the battery is normal according to the battery status parameter, and provides a signal to the switch controlling module; the switch controlling module generates an on/off signal according to the signal provided by the data analyzing module, and applies the on/off signal to the main circuit switch and the isolating switch in the switch battery module, so as to control the on and off of the main circuit switch and the isolating switch in the switch battery module alternatively. When fault occurs to a specific battery in the system for self-isolating abnormal battery, the battery can be isolated, without affecting normal use of the whole system, so that when battery capacity is sufficient, the whole system will not break down due to damage of a specific or several batteries.

Figure 3:
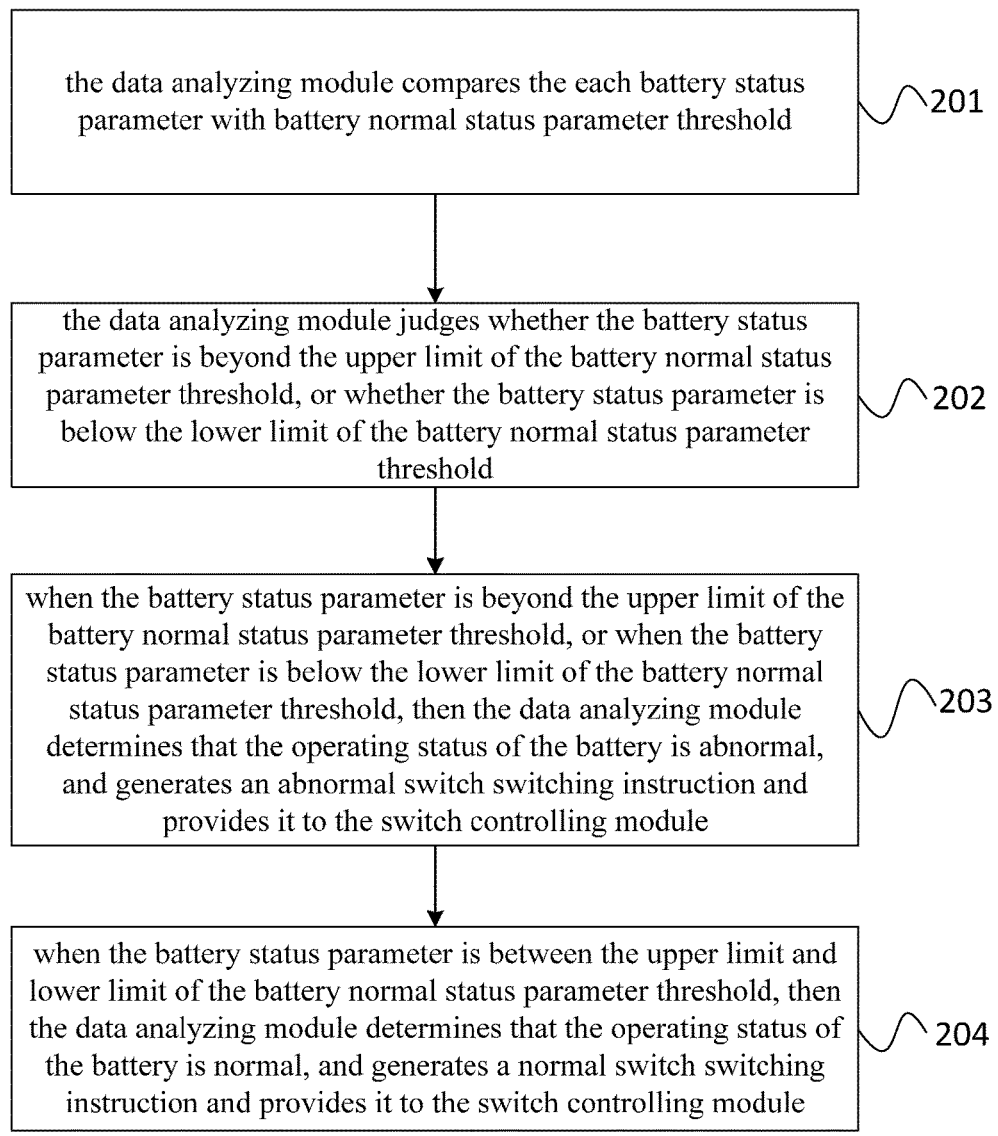
FIG. 3 is a flow diagram of a method for self-isolating abnormal battery according to second method embodiment of the present invention.
Figure 4:
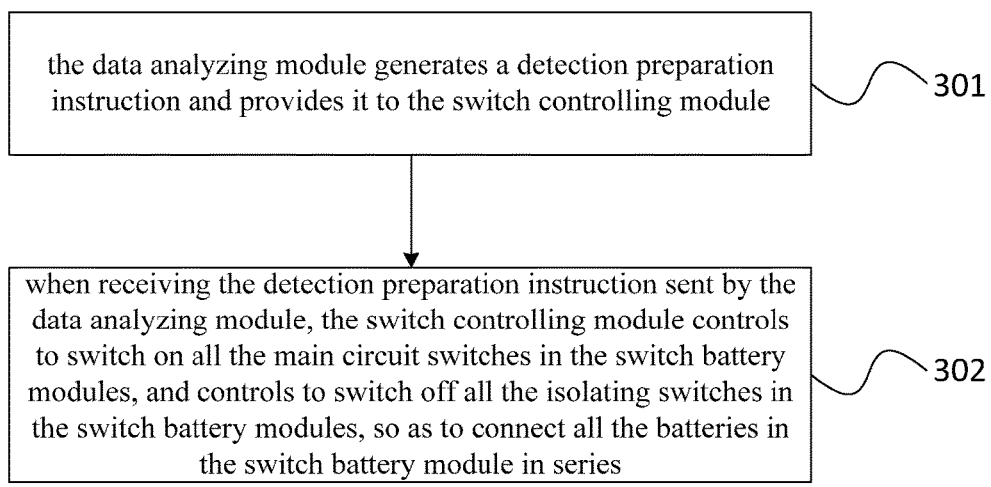
FIG. 4 is a flow diagram of a method for self-isolating abnormal battery according to third method embodiment of the present invention.

FIG. 3 is a flow diagram of a method for self-isolating abnormal battery according to a second method embodiment of the present invention, as shown in FIG. 3, the method of the present embodiment includes detailed operations of Step 102 in the first method embodiment shown in FIG. 2, specifically, Step 102 includes the following steps:

Step 201, the data analyzing module compares the each battery status parameter with battery normal status parameter threshold.

The data analyzing module compares the each battery status parameter with the battery normal status parameter threshold, including the upper limit and lower limit of the normal operating parameter threshold.

Step 202, the data analyzing module judges whether the battery status parameter is beyond the upper limit of the battery normal status parameter threshold, or whether the battery status parameter is below the lower limit of the battery normal status parameter threshold.

The data analyzing module judges whether the battery status parameter is beyond the upper limit of the battery normal status parameter threshold, or whether the battery status parameter is below the lower limit of the battery normal status parameter threshold.

The battery status parameter includes at least one of the following parameters: voltage value of the battery, temperature value of the battery and internal pressure value within the shell of the battery.

The upper limit of the battery normal status parameter threshold includes at least one of the following parameters: upper voltage threshold value of the battery, upper temperature threshold value of the battery and upper internal pressure threshold value of the shell of the battery.

The lower limit of the battery normal status parameter threshold includes at least one of the following parameters: lower voltage threshold value of the battery and lower temperature threshold value of the battery.

Step 203, when the battery status parameter is beyond the upper limit of the battery normal status parameter threshold, or when the battery status parameter is below the lower limit of the battery normal status parameter threshold, then the data analyzing module determines that the operating status of the battery is abnormal, and generates an abnormal switch switching instruction and provides it to the switch controlling module.

Comparing at least one of the voltage value of the battery, temperature value of the battery and internal pressure value within the shell of the battery with the upper limit of the battery normal status parameter threshold or the lower limit of the battery normal status parameter threshold, when the battery status parameter is beyond the upper limit of the battery normal status parameter threshold, or when the battery status parameter is below the lower limit of the battery normal status parameter threshold, then it is determined that the operating status of the battery is abnormal. At this time, the data analyzing module will generate an abnormal switch switching instruction, and provide it to the switch controlling module, the abnormal switch switching instruction is used for instructing to switch off the main circuit switch, and switch on the isolating switch, after receiving the abnormal switch switching instruction, the switch controlling module will switch off the main circuit switch connected in series with the abnormal battery, and switch on the isolating switch connected in parallel to the abnormal battery.

Step 204, when the battery status parameter is between the upper limit and lower limit of the battery normal status parameter threshold, then the data analyzing module determines that the operating status of the battery is normal, and generates a normal switch switching instruction and provides it to the switch controlling module.

After comparing at least one of the voltage value of the battery, temperature value of the battery and internal pressure value within the shell of the battery with the upper limit of the battery normal status parameter threshold or the lower limit of the battery normal status parameter threshold, when the battery status parameter is within the range between the upper limit of the battery normal status parameter threshold, then the data analyzing module determines that the operating status of the battery is normal, the data analyzing module will generate a normal switch switching instruction, and provide it to the switch controlling module, the normal switch switching instruction is used for instructing to switch on the main circuit switch, and switch off the isolating switch, after receiving the normal switch switching instruction, the switch controlling module will switch on the main circuit switch connected in series with the normal battery, and switch off the isolating switch connected in parallel to the normal battery.

In the method for self-isolating abnormal battery of the present embodiment, the data analyzing module compares each battery status parameter with the battery normal status parameter threshold; and judges whether the battery status parameter is beyond the upper limit of the battery normal status parameter threshold, or, whether the battery status parameter is below the lower limit of the battery normal status parameter threshold; when the battery status parameter is beyond the upper limit of the battery normal status parameter threshold, or, when the battery status parameter is below the lower limit of the battery normal status parameter threshold, then determines that the operating status of the battery is abnormal, and generates an abnormal switch switching instruction, and provides it to the switch controlling module; when the battery status parameter is within the range between the upper limit and lower limit of the parameter threshold of the battery normal status parameter threshold, then determines that the operating status of the battery is normal, and generates a normal switch switching instruction and provides it to the switch controlling module. The data analyzing module will accurately analyze whether fault occurs to the battery by comparing the value, and generate a corresponding instruction to the switch controlling module, so as to react in time, which can achieve isolation of abnormal battery in real time when fault occurs to a specific battery in the system, without affecting normal use of the whole system.

Alternatively, before the data analyzing module receives the battery status parameter collected by the battery detecting module, further includes:

Step 301, the data analyzing module generates a detection preparation instruction and provides it to the switch controlling module.

Before the battery detecting module sends the collected battery status parameter to the data analyzing module, the data analyzing module will send a detection preparation instruction to the switch controlling module, after receiving the detection preparation instruction, the switch controlling module will instruct to switch on or switch off the main circuit switch and the isolating switch.

Step 302, when receiving the detection preparation instruction sent by the data analyzing module, the switch controlling module controls to switch on all the main circuit switches in the switch battery modules, and controls to switch off all the isolating switches in the switch battery modules, so as to connect all the batteries in the switch battery module in series.

After receiving the detection preparation instruction, the switch controlling module will control to switch on all the main circuit switches in the system for self-isolating abnormal battery, and control to switch off all the isolating switches, when all the main circuit switches are switched on, all the batteries in the switch battery module are connected in series.

In the method for self-isolating abnormal battery of the present embodiment, before receiving the battery status parameter collected by the battery detection module, the data analyzing module generates a detection preparation instruction and provides it to the switch controlling module; when receiving the detection preparation instruction sent by the data analyzing module, the switch controlling module controls to switch on all the main circuit switches in the switch battery modules, and control to switch off all the isolating switches in the switch battery modules, so as to connect all the batteries in the switch battery modules in series. At the initial operating period of the system for self-isolating abnormal battery, the data analyzing module controls the switch controlling module to connect all the batteries in series, so that the system for self-isolating abnormal battery transmits electric energy at much as possible.

In the method for self-isolating abnormal battery, the mentioned main circuit switch and isolating switch are physical switches or chemical switches. For example, when the main circuit switch and the isolating switch are physical switches, they could be relays, semiconductor switches, magnetic valves, mechanical clips, when the main circuit switch and the isolating switch are chemical switches, they could be membrane switches etc.

The secondary battery can be Li-ion battery, Sod-ion battery, NI-MH battery, lead-acid battery etc.

Finally, it should be noted that: the above embodiments are only used to illustrate the technical solutions of the present invention, rather than limiting; although the invention is illustrated in detail with reference to the above embodiments, person skilled in the art shall understand: they can still make modifications to the technical solutions recorded in the above embodiments, or make equivalent replacements to part or all of the technical features; however, these modifications or replacements will not let the essence of corresponding technical solutions depart from the scope of the technical solutions of the embodiments of the present invention.

What is claimed is:

1. A system for self-isolating an abnormal battery, comprising: a switch controlling module, a battery detecting module, a data analyzing module and at least two switch battery modules;

each of the at least two switch battery modules comprises at least one isolating switch, at least one main circuit switch and a battery, the at least one main circuit switch is connected with the battery in series to form a series circuit, the series circuit is connected in parallel to the at least one isolating switch so as to form one of the at least two switch battery modules, the at least two switch battery modules are connected with each other in series;

the battery detecting module is configured to detect a battery status parameter and provide the detected battery status parameter to the data analyzing module;

the data analyzing module is configured to judge whether an operating status of the battery is normal or not according to the battery status parameter, and provide a signal to the switch controlling module;

the switch controlling module is configured to generate an on/off signal according to the signal provided by the data analyzing module, and apply the on/off signal to the at least one main circuit switch and the at least one isolating switch in one of the at least two switch battery modules, so as to alternatively control on/off of the at least one main circuit switch and the at least one isolating switch in one of the at least two switch battery modules, the data analyzing module is further configured to: generate a detection preparation instruction before receiving the battery status parameter provided by the battery detecting module, and provide it to the switch controlling module, the switch controlling module is further configured to: when receiving the detection preparation instruction sent by the data analyzing module, control to switch on all the main circuit switches in the at least two switch battery modules, and control to switch off all the isolating switches in the at least two switch battery modules, so as to connect all the batteries in the at least two switch battery modules in series.

2. The system for self-isolating abnormal battery according to claim 1, wherein, the battery status parameter detected by the battery detecting module comprises at least one of following parameters:

a voltage value of the battery, a temperature value of the battery and an internal pressure value within a shell of the battery.

3. The system for self-isolating abnormal battery according to claim 1, wherein, the data analyzing module is configured to:

compare each battery status parameter with a battery normal status parameter threshold;

judge whether the battery status parameter is beyond an upper limit of the battery normal status parameter threshold, or whether the battery status parameter is below a lower limit of the battery normal status parameter threshold;

when the battery status parameter is beyond the upper limit of the battery normal status parameter threshold, or when the battery status parameter is below the lower limit of the battery normal status parameter threshold, then determine that an operating status of the battery is abnormal, and generate an abnormal switch switching instruction and provide it to the switch controlling module;

when the battery status parameter is within a range between the upper limit and lower limit of the battery normal status parameter threshold, then determine that an operating status of the battery is normal, and generate a normal switch switching instruction and provide it to the switch controlling module.

4. The system for self-isolating abnormal battery according to claim 3, wherein, the abnormal switch switching instruction is used for instructing to switch off the at least one main circuit switch, and switch on the at least one isolating switch;

the normal switch switching instruction is used for instructing to switch on the at least one main circuit switch, and switch off the at least one isolating switch.

5. The system for self-isolating abnormal battery according to claim 3, wherein, the upper limit of the battery normal status parameter threshold comprises at least one of following parameters:

an upper limit of a voltage threshold value of the battery, an upper limit of a temperature threshold value of the battery and an upper limit of an internal pressure threshold value of the shell of the battery.

6. The system for self-isolating abnormal battery according to claim 3, wherein, the lower limit of the battery normal status parameter threshold comprises at least one of following parameters:

a lower limit of a voltage threshold value of the battery and a lower limit of a temperature threshold value of the battery.

7. A method for self-isolating an abnormal battery, which is executed by the system for self-isolating an abnormal battery according to claim 1, wherein, the method comprises the steps of:

collecting, by the battery detecting module, a battery status parameter and sending the battery status parameter to the data analyzing module;

judging, by the data analyzing module, whether an operating status of the battery is normal or not according to the battery status parameter, and providing a signal to the switch controlling module;

generating, by the switch controlling module, an on/off signal according to the signal provided by the data analyzing module, and applying the on/off signal to the at least one main circuit switch and the at least one isolating switch in one of the at least two switch battery modules, so as to alternatively control on/off of the at least one main circuit switch and the at least one isolating switch in one of the at least two switch battery modules, wherein, before the data analyzing module receives the battery status parameter provided by the battery detecting module, the method further comprises:

generating, by the data analyzing module, a detection preparation instruction and providing it to the switch controlling module;

receiving, by the switch controlling module, the detection preparation instruction sent by the data analyzing module; controlling, by the switch controlling module, to switch on all the main circuit switches in the at least two switch battery modules; and controlling, by the switch controlling module, to switch off all the isolating switches in the at least two switch battery modules, so as to connect all the batteries in the at least two switch battery modules in series.

8. The method for self-isolating abnormal battery according to claim 7, wherein, the step of judging, by the data analyzing module, whether the operating status of the battery is normal or not according to the battery status parameter, and providing a signal to the switch controlling module, comprises:

comparing, by the data analyzing module, each battery status parameter with a battery normal status parameter threshold;

judging, by the data analyzing module, whether the battery status parameter is beyond an upper limit of the battery normal status parameter threshold, or whether the battery status parameter is below a lower limit of the battery normal status parameter threshold;

when the battery status parameter is beyond the upper limit of the battery normal status parameter threshold, or when the battery status parameter is below the lower limit of the battery normal status parameter threshold, then determining, by the data analyzing module, that the operating status of the battery is abnormal, and generating an abnormal switch switching instruction and providing it to the switch controlling module;

when the battery status parameter is within a range between the upper limit and lower limit of the battery normal status parameter threshold, then determining, by the data analyzing module, that the operating status of the battery is normal, and generating a normal switch switching instruction and providing it to the switch controlling module.

* * * * *